United States Patent [19]
Pennino

[11] 4,231,908
[45] Nov. 4, 1980

[54] COMPOSITION FOR USE BETWEEN POLYMERIC TIE PLATES AND CROSS TIES

[75] Inventor: Charles J. Pennino, Monroeville, Pa.

[73] Assignee: Koppers Company, Inc., Pittsburgh, Pa.

[21] Appl. No.: 14,336

[22] Filed: Feb. 23, 1979

Related U.S. Application Data

[63] Continuation of Ser. No. 846,685, Oct. 31, 1977, abandoned, which is a continuation-in-part of Ser. No. 766,447, Feb. 7, 1977, abandoned.

[51] Int. Cl.[3] .......... C08L 91/00; E01B 9/40
[52] U.S. Cl. .......... 260/28.5 AS; 238/283; 238/287
[58] Field of Search .......... 260/28.5 AS; 238/283, 238/287

[56] References Cited

U.S. PATENT DOCUMENTS

| | | | |
|---|---|---|---|
| 2,686,009 | 8/1954 | Crowe | 238/283 |
| 2,713,013 | 7/1955 | Spokes | 238/283 |
| 2,886,248 | 5/1959 | Laudig | 238/283 |
| 2,892,592 | 6/1959 | Greene et al. | 260/28.5 AS |
| 3,081,035 | 3/1963 | Meyer | 238/283 |
| 3,358,925 | 12/1967 | Pennino et al. | 238/287 |
| 3,379,662 | 4/1968 | Bramble et al. | 260/28.5 AS |
| 3,544,006 | 12/1970 | Pennino | 238/283 |
| 3,919,148 | 11/1975 | Winters et al. | 260/28.5 AS |
| 3,931,439 | 1/1976 | Bresson et al. | 260/28.5 AS |

OTHER PUBLICATIONS

Modern Railroads–Jun. 1955, pp. 67 & 69.

*Primary Examiner*—V. P. Hoke
*Attorney, Agent, or Firm*—Oscar B. Brumback; Herbert J. Zeh, Jr.; J. Timothy Keane

[57] ABSTRACT

A gap-filling, adhesive composition is provided which is used between polymeric tie plates and the dapped area of a wood, concrete or polyethylene cross tie. This composition contains 65 to 75 wt. % of an asphalt having a softening point in the range of 75° C. to 100° C., 10 to 20 wt. % of a styrene butadiene copolymer having a molecular weigh of 60,000 to 91,000, and 7 to 25 wt. % of a processing oil having a viscosity in the range of 427 poises at 37.78° C. to around 2,500 poises at 37.78° C. and having a flash point in the range of 210° C. to around 250° C. The composition has a viscosity in the range of about 100 to around 300 poises at 150° C.

5 Claims, 4 Drawing Figures

COMPOSITION FOR USE BETWEEN POLYMERIC TIE PLATES AND CROSS TIES

CROSS-REFERENCE TO RELATED APPLICATIONS

This is a continuation of application Ser. No. 846,685, filed Oct. 31, 1977, now abandoned, which is a continuation-in-part of application Ser. No. 766,447, filed Feb. 7, 1977, now abandoned.

BACKGROUND OF THE INVENTION

This invention relates to a gap-filling, adhesive composition for use with polymeric tie plates which are disposed in the dapped area of a wood, concrete or polyethylene railroad cross tie.

In the art of fastening railroad rails to cross ties, a metal tie plate is generally used between the rail and the cross tie. In U.S. Pat. No. 2,886,248 (Laudig) it was taught that a tie pad composition could be used between the metal tie plate and the wooden cross tie. The autoadhesive, autosealing tie pad composition contained: 45–65 wt. % asphalt, 5–25 wt. % heavy naphthalene base residuum, 3–12 wt. % pine tar and 10–35 wt. % of at least one rubbery elastomer. The asphalt has a penetration between 30 and 50 and a softening point between 100° and 170° F. (37.78° C.–76.67° C.). The naphthalene base has a viscosity of about 40–55 Saybolt Fural seconds at 210° F. (98.89° C.). The pine tar is a high grade retort tar made by the destructive distillation of wood. The rubbery elastomer can be a natural rubber, used rubber, or a synthetic rubber like a copolymer of butadiene and styrene (GR-S). The tie pad also may contain a fibrous membrane or filler but it may consist simply of the adhesive and sealant composition.

In U.S. Pat. No. 3,358,925 of which I was a co-inventor, there was disclosed a non-metallic tie plate which could be adhesively bonded to a wooden cross tie. The non-metallic plate consists of a plastic material like polyurethane or epoxy. The adhesive used to bond these non-metallic tie plates to the wood cross tie are resorcinol or epoxy adhesives. Also in my prior U.S. Pat. No. 3,544,006, I disclosed a non-metallic tie plate comprised of high density polyethylene. The high density polyethylene tie plate is disposed in a dapped area of a railroad cross tie and is usable with railroad spikes.

Polymers such as polyolefins have inherent shrink properties which cause the formation of slight sinks or pits in the base of the polyolefin tie plates during cooling after injection molding. These sinks make it difficult to have a good contact with other flat substrates like wood, concrete or polyethylene. When the substrate is wood, irregularities on the surface of the wood like checks, small splits, knots, worm holes, etc. further complicate optimum contact. Even if the polyolefin tie plates are molded in such a manner to produce a flat bottomed base with no sinks, damage may occur to the plates due to their movement while in service.

It has been found when polyolefin tie plates were attached directly to a wood or concrete cross tie that moisture, dust, and abrasive particles accumulate between the tie plate and the cross tie in the dapped area. Moisture present from rain, melting snow or condensation from the atmosphere, when the tie plate is cooler than the surrounding air, softens the topmost wood fibers of the cross tie. This softening makes it easier for the movement of the tie plate to abrade the wooded cross tie in the restrictive dapped area which acts as a catch-all. The dust and abrasive particles, like sand from the roadbed, lodge between the tie plate and the cross tie in the dapped area that acts as a receptacle and add to the deterioration and loss of service of the wooden cross tie. Also, with plates having flat bases, the movement of the tie plate while in service should be restricted as much as possible to prolong the life of the plate.

Some type of adhesive material with good adhesive strength is needed to fill the gap between, and also restrict the movement of, the polymeric tie plate and the wood or concrete or polyethylene cross tie. Adhesives containing 50–55% solids adhere fairly well to the polyolefin tie plate but these adhesives do not give adequate contact between the polyolefin tie plates and wood or concrete cross ties. This is caused by the loss of volume of the adhesive on drying. Even thick fluid solvent-containing adhesives may not give optimum contact between polyolefin tie plates and wood or concrete cross ties. Also, polyolefin tie plates are not naturally conducive to the use of several types of adhesives. Epoxy adhesive systems do not adhere satisfactorily to the waxy surface of polyolefin. Also, in the 100 percent polyurethane two component adhesive systems, component A, an isocyanate, reacts rapidly with wood moisture and moisture in concrete to form poor adhesive bonds. Also, epoxy and polyurethane adhesives, respectively, are two component systems which are troublesome to apply in the field, especially to cross ties in railroad tracks; and require expensive metering, mixing and dispensing equipment.

It is an object of this invention to provide a gap-filling, adhesive composition which gives optimum contact between the polymeric tie plate disposed in the dapped area of a wood, concrete or polyethylene cross tie and which is not dependent on chemical reactions but yet offers flexibility and good adhesive strength for long periods of time sufficient to hold the polymeric tie plate to the wood, concrete or polyethylene cross tie, especially in the dapped load bearing area.

SUMMARY OF THE INVENTION

The present invention is directed to a gap-filling, adhesive composition which is positioned between a polymeric tie plate and the dapped area of a wood, concrete or polyethylene cross tie. The composition comprises: 65 to 75 wt. % of an asphalt having a softening point in the range of 75° to 100° C.; 10 to 20 wt. % of a styrene butadiene copolymer having a molecular weight in the range of 60,000 to 91,000; and 7 to 25 wt. % of a processing oil having a viscosity in the range of 427 poises at 37.78° C. to around 2,500 poises at 37.78° C. and a flash point in the range of 210° C. to around 250° C. The gap-filling, adhesive composition has a viscosity in the range of about 100 to 300 poises at 150° C.

Other additives like anti-oxidants, tackifiers and fillers may be added to the gap-filling, adhesive compositions.

The polymeric tie plates may be made of a polyolefin such as high density polyethylene, higher molecular weight polyethylenes having a molecular weight around one million and including ultra high molecular weight polyethylene, polypropylene and polyurethanes.

GENERAL DESCRIPTION OF THE DRAWINGS

DETAILED DESCRIPTION OF THE DRAWINGS

Figure 1:
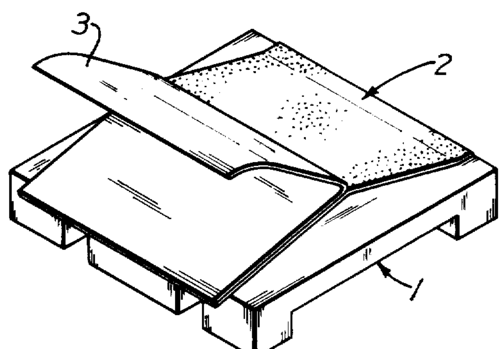
FIG. 1 is a view of the gap-filling, adhesive composition being applied to a polyethylene tie plate.

In FIG. 1 a high density polyethylene tie plate, for example, is shown generally indicated at 1 and having applied to it the gap-filling, adhesive composition of this invention. The gap-filling, adhesive composition 2 is applied to the high density polyethylene tie plate 1 and the release paper 3 is pulled from the gap-filling, adhesive composition as the composition comes in contact with the high density polyethylene tie plate.

The high density polyethylene tie plate or, in general, the polymeric tie plate consists of a right-angled parallelepiped which has a relatively flat bottomed surface for resting upon a railroad cross tie and has an upper surface spaced apart from the bottom surface. The recessed upper surface carries a rail; the recess extends from one end to the opposite end of the tie plate and defines a planar surface which is canted from one side to the opposite side of the tie plate at a slope of approximately one unit of rise to 40 units of run with respect to the bottom surface. Shoulders are thereby provided at each side of the plate which shoulders provide an inner surface meeting the planar recess surface for restricting the lateral movement of the rail carried by the recess. Also provided by the shoulders is an outer surface meeting the flat bottom surface which, when the tie plate is disposed into a recess rabbetted on a tie, a dapped area, restricts the lateral movement of the tie plate with respect to the tie by the outer surface engaging the sidewalls of the recess in the tie to maintain gage. Slots in each shoulder are spaced at locations on each side of the tie plate, the slots on each side being diametrically opposed and each slot extending from the edge of the plate to the recessed surface of the tie plate for receiving a spike. This high density polyethylene tie plate is further defined and described in my U.S. Pat. No. 3,544,006, the teaching of which is hereby incorporated by reference.

The gap-filling, adhesive composition according to this invention can be used to attach preferably the high density polyethylene tie plate to the cross tie in a dapped area, but tie plates made of other polymeric substances like polyolefin, polypropylene, higher molecular weight polyethylene such as ultra high molecular weight polyethylene, and polyurethane can be attached with this gap-filling, adhesive composition. The composition consists of 65 to 75 wt. % of an asphalt, 10 to 20 wt. % of a styrene butadiene copolymer and 7 to 25 wt. % of a processing oil.

The asphalt has a softening point in the range of 75° C. to 100° C. and a penetration value in the range of 50 to 10. The test for softening point (ASTM D36) is a measure of the softness, consistency, flow or plasticity of the material at elevated temperatures. It is used in conjunction with penetration tests to furnish a general indication of the relative temperature susceptibility of two or more asphalts of the same penetration measurement. The penetration value which measures the consistency of bituminous material is expressed as the distance that a standard needle penetrates vertically into a sample of the material under known conditions of loading, time, and temperature. These conditions are 100 grams, 5 seconds, and 25° C. (77° F.), respectively, and the units of penetration are expressed in tenths of a millimeter. This penetration value is determined according to the procedure of ASTM test D5-52, "Standard Method of Test for Penetration of Bituminous Materials." The air-blown asphalts, which are those made by oxidation of asphalt-based reduced crude, useful in the composition of this invention are known as ASTM classification type 2, 3 and 4 asphalts designated D312.

The styrene butadiene copolymer is a block copolymer having a low molecular weight in the range of 60,000 to 91,000. The preferred styrene butadiene copolymer used in the composition of this invention is "Solprene 1205" in crumb form which is available from Phillips Petroleum Company, Chemical Department, Rubber Chemicals Division, 318 Water Street, Akron, Ohio 44308. Alternatively, "Kraton 1102" styrene butadiene copolymer which is available from Shell Chemical Company can be used in the composition of this invention.

The processing oil used in the composition of this invention is a petroleum oil having a viscosity in the range of 127 poises at 100° F. (37.78° C.) to around 2,500 poises at 37.78° C. (100° F.) and a flash point in the range of 210° C. to around 250° C. The viscosity is a measure of the consistency of the processing oil and is expressed in poises. The flash point test is performed by the Cleveland open-cup method which is prescribed in ASTM D-92. The preferred processing oil used in the composition of this invention is "Shellflex 371" oil which is available from Shell Chemical Company, Petrochemicals Division, 1212 Avenue of the Americas, New York, N.Y. 10036. The Shellflex 371 oil has a viscosity in the range of 427° at 100° F. to 53.5 at 210° F. and it has a flash point of 410° F. Also, this oil has a distillation initial boiling point at 710° F. and 90% of the oil is distilled at 865° F. This oil has a viscosity gravity constant of 0.839 and consists of 3% aromatic carbons, 44% naphthenic carbons and 55% paraffinic carbons. Other processing oils can be used in the composition of this invention, for example, "Shellflex No. 881" and "Drakeol No. 35", a mineral oil. Also, a blend of the 371 and 881 oils may be used. The preferred component amounts and component ratios are as follows:

Solprene 1205: 57.3 wt. %
Shellflex 371: 77.6 wt. %
Asphalt: 255.1 wt. %
Agerite Stalite: 0.86 wt. %
Rubber/oil ratio: 1/1.4
Rubber/asphalt ratio: ¼ to 5

The Mettler drop point in degrees centigrade is in the range of 110 to 122 and the brittle point (membrane) in degrees centigrade is minus 9 to minus 25, and the viscosity of the composition is in the range of about 100 to around 300 poises at 150° C.

The Agerite Stalite, a mixture of alkylated diphenylamines, is added to the composition as an anti-oxidant. The amount of the Agerite Stalite or any comparable or equivalent anti-oxidant should be in the range of 0.80% to 2.0% of the weight of the rubber, but this amount may be increased to protect the properties of the composition.

The composition is prepared by dispersing the Solprene 1205 at elevated temperatures in the range of 135° to 150° C., and preferably 140° to 145° C., into the asphalt, which has been modified by the addition of the processing oil. The composition is stirred by either an anchor type stirrer, Sigmoid blade stirrer, Hobart mixing blades or Cowles stirrer at various rotational speeds. The preferred method of stirring is with the Hobart mixing blade since the Cowles stirrer, at higher rotational speeds, can incorporate excess air. The preferred oil, Shellflex 371 processing oil, may be replaced satisfactorily with Drakeol No. 35, a mineral oil. Also, blends of Shellflex 371 and Shellflex 881 processing oil may be used where moderately low brittle points (about −5° to −9° C.) and harder bitumens with low weight losses are desired for the adhesive composition. Also, the Shellflex 371 or Drakeol No. 35 oils may be used for the adhesive composition with lower brittle points (−20° to −25° C.). The dispersion time for the rubber in asphalt oil solution with the Hobart stirrer generally ranges from 4 to 6 hours.

After the composition is mixed into a smooth rubber dispersion in the asphalt oil solution, the composition is suitable for extrusion. The composition can be extruded in any extrusion equipment known to those skilled in the art. Examples of extruders that can be used are an NRM 1-inch bench model extruder, Davis-standard extruder, or even a Moyno pump. But the preferred equipment is the Moyno pump because of ease and expense of operation. The extrudate of the composition has a smooth consistency and is sandwiched between release paper. Any release paper known to those skilled in the art may be used but it was found best to use release paper available from Daubert Chemical Company with a product number of 1-65KG-F.

Figure 2:
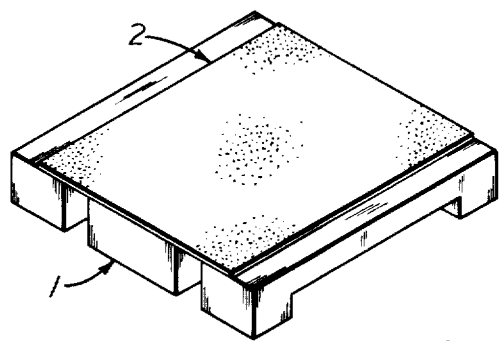
FIG. 2 is a view of the gap-filling, adhesive composition adhering to a polyethylene tie plate before being placed in the dapped area of a cross tie.

FIG. 2 shows the extruded composition 2 without release paper and adhering to the base of the high density polyethylene tie plate 1. In this figure, the release paper has been removed from both sides of the extruded composition and the one side has been attached to the base of the high density polyethylene tie plate, leaving the other side available to be attached to the dapped area of a wood, concrete, high density polyethylene or steel cross tie.

Figure 4:
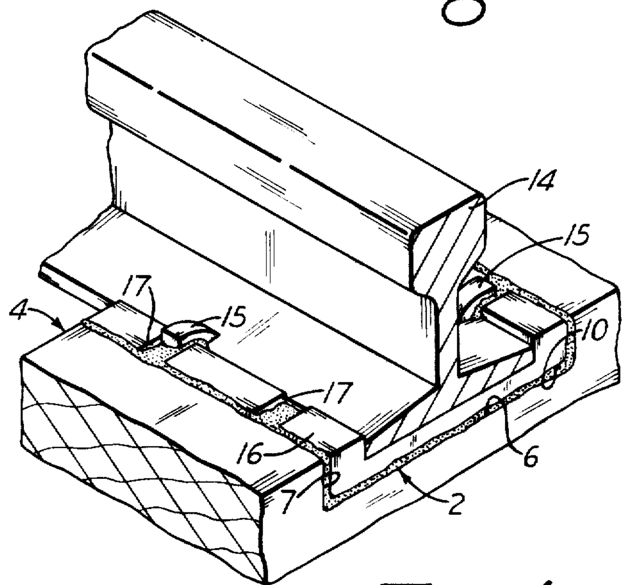
FIG. 4 is a view depicting the system for securing the rail comprising a polyethylene tie plate; a gap-filling, adhesive composition; and dapped cross tie in place after rail cars trafficked over the system.
Figure 3:
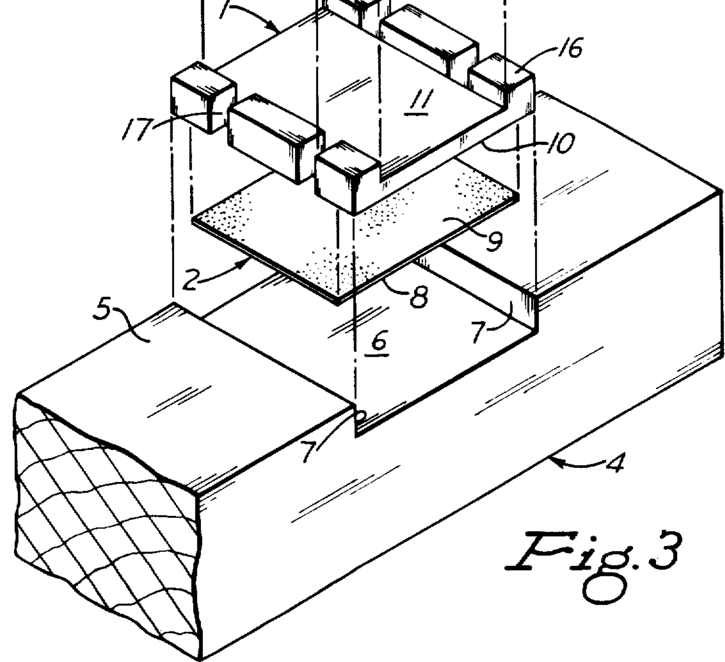
FIG. 3 is an exploded perspective view of the disposition of the gap-filling, adhesive composition between a polyethylene tie plate with a rail and spike and the dapped area of a cross tie.

In FIG. 3, a cross tie, preferably made of wood, is shown generally indicated at 4 to carry the extruded composition 2 with release paper removed, and a high density polyethylene tie plate, which adheres to the composition, and a conventional rail 14, which is supported by the tie plate 1 and secured by spikes 15 to the cross tie 4. Generally, two such rails are secured to each cross tie by a tie plate at spaced-apart distances from one another to form the gauge of the track. The cross tie 4 has a rectangular recess indicated at 6 transversely cut into the upper surface 5 of the cross tie providing sidewalls 7 which extend to a depth of about 7/8ths inches. The depth will depend upon the thickness of the extruded composition 2 and of the tie plate 1 so that the tie plate 1 and extruded composition 2 fits with the upper surface 5 of the cross tie, as shown in FIG. 4. The extruded composition 2 with release paper removed has its bottom surface 8 placed into the recessed or dapped area 6 of the cross tie 4 and the high density polyethylene tie plate 1 is placed on the extruded composition in such a manner that the upper surface of the extruded composition 9 adheres to the base 10 of the high density polyethylene tie plate. Then the base 12 of a conventional rail 14 is placed on the surface 11 of the high density polyethylene tie plate so that the sidewall 13 of the rail fits snugly against the shoulders 16 of the high density polyethylene tie plate. Then spikes 15 are driven into the cross tie in such a manner that they pass through slots 17 in the high density polyethylene tie plate 1. These slots 17 on each side of the high density polyethylene tie plate are diametrically opposite one another and they extend from the edge of the tie plate to the base of the tie plate 10. The system of cross tie, extruded composition, high density polyethylene tie plate and rail with spikes, as shown in FIG. 3, will not have any slippage between the high density polyethylene tie plate used as an example of polymeric tie plates and the cross tie.

FIG. 4 depicts a system consisting of cross tie, extruded composition, high density polyethylene tie plate, conventional rail and spikes after it has been trafficked by diesel engines and rail cars. The extruded composition 2 has been squeezed into the area between the sidewall 7 of the dapped area of the cross tie and the outer edge of the shoulder 16 of the high density polyethylene tie plate. Also, the extruded composition has been forced out of the dapped area of the cross tie to overhang the cross tie between the dapped area 6 and the edge of the high density polyethylene tie plate near the bottom surface 10 of the tie plate. In addition, the extruded composition has moved up in the area between the sidewall 7 of the cross tie and the outer edge of the shoulder 16 of the tie plate and can be seen on the surface 5 of the cross tie. Furthermore, the extruded composition has moved into all of the spike slots 17 in the high density polyethylene tie plate 1 and has completely surrounded spikes 15 which are present in some of the spike slots 17. This displacement of the extruded composition provides an effective barrier against water and abrasive particles and prevents these materials from damaging the cross tie and the high density polyethylene tie plate while adequately supporting the conventional rail and loads. Thus, the extruded composition acts as a gap-filling material to exclude water and foreign matter in the load bearing areas of the cross tie locking into the sinks on the bottom side of the high density polyethylene tie plate and, most important, to act as an adhesive which, with addition of spikes, adequately supports a conventional rail. Should the bond break between the high density polyethylene tie plate and the extruded gap-filling adhesive composition at very low temperatures (−20° C.) and the composition by some chance should crack or break due to lower temperatures than −20° C., on returning to temperatures above 0° C. the broken or cracked composition would heal and reseal the area under the load on the cross tie.

The composition may be placed in the system of the dapped cross tie, composition, high density polyethylene tie plate and conventional rail with spikes in several different ways. The composition may be placed in existing railroad track by hand between a cross tie and a high density polyethylene tie plate when the tie plate or cross tie is changed or general repairs are effected on the railroad track. Also, a system may be produced that consists of a wood, concrete, steel or high density polyethylene cross tie already containing the adhesive composition adhered to the dapped area of the cross tie which is already adhered to a high density polyethylene tie plate which is also contained in the dapped area of the cross tie. This whole system of cross tie, composition and high density polyethylene tie plate may then be placed in the railroad track. The gap-filling, adhesive composition placed in the dapped area in practice ranges from 0.06 to approximately 0.11 inches in thickness.

The system of the high density polyethylene tie plate attached to wood in a dapped or confined area with a gap-filling, adhesive composition in between the high density polyethylene tie plate and the cross tie in the dapped area does not permit the development of lateral forces by slippage which will loosen, shear or break spikes. The shoulders of the high density polyethylene tie plates in dapped cross ties with gap-filling, adhesive composition between the tie plate and the dapped area of the cross tie sustain lateral loads and protects the spike. Retention of the gap-filling, adhesive composition in the dapped area of a cross tie after being trafficked by railroad engines and cars ranges around 50 to 75% for a soft, low brittle point material and 60 to 85% for a harder material. This retention is estimated by collecting the flash squeezed out by the weight of diesels and freight cars over the system of cross tie; gap-filling, adhesive composition; high density polyethylene tie plate; and conventional rails with spikes. The gap-filling, adhesive composition can be used in a pre-fabricated system consisting of the gap-filling, adhesive composition and high density polyethylene tie plates attached to a dapped cross tie for placement in track. This pre-fabricated system will reduce the time required for the installation of cross ties in new track and in tie renewal programs. The gap-filling, adhesive composition can be attached to the high density polyethylene tie plate and then placed into a pre-dapped area during tie replacement programs. During a rail relay program, several successful field tests were conducted where existing cross ties in tracks were dapped with an appropriate adzer and high density polyethylene tie plates with the attached gap-filling, adhesive composition were placed in the dap. In both of these instances the rail is replaced or placed into the rail seat of the high density polyethylene tie plate and spiked according to railroad practices. The first train to pass spreads the adhesive between the tie plate and the wood in the dap and the total system is fixed.

The following examples are illustrative of the present invention, but are not to be construed as limiting the scope thereof in any manner.

Table I presents data such as components, amounts of components, and conditions in the production of a rubberized asphalt processing oil mixture which is extruded to produce the gap-filling, adhesive composition of this invention. This mixture is obtained by adding an amount of Solprene 1205 styrene butadiene block copolymer in crumb form to a 55-gallon drum at 140° C. to 150° C. heated by band heaters and containing the required amounts of asphalt and oil and an appropriate anti-oxidant. A Cowles blender was used at 700 to 800 rpm to form a smooth rubber dispersion in the asphalt/processing oil solution suitable for extrusion. The dispersion time for the rubber ranged from 4 to 6 hours. The Mettler drop point of the rubberized asphalt was in the range of 110° C. both before and after extrusion. The mixture had been kept hot for approximately three days prior to any extrusion. This temperature was in the range of 100° to 160° C. The brittle points of the rubberized asphalt processing oil mixture were determined in multiply membranes by the ASTM D746-64T. The rubberized asphalt processing oil mixture in a 55-gallon drum weighed approximately 390 lbs. per drum.

TABLE I

Preparation of Rubberized Asphalt Processing Oil Mixture For Gap-filling, Adhesive Composition (all Weights in Pounds)

| Run | #1 | #2 | #3 | #4 |
|---|---|---|---|---|
| Asphalt[a] | 19.6 | 19.6 | .897 | 255.1 |
| Rubber | 3.76 | 4.41 | .202 | 57.3 |
| Agerite Stalite 881 | 0.057<br>5.07 | 0.066<br>— | .003<br>— | 0.87<br>— |
| Shellflex 371 | — | 4.5 | .273 | 77.6 |
| Drakeol #35 | 1.56 | 1.47 | — | — |
| % Rubber | 12.5 | 14.7 | 14.6 | 14.7 |
| Blending Temperature, °C. | 130–148 | 137–150 | 150–160 | 133–155 |
| Time, hours | 6½ | 7 | 4 | Av. 5½ |
| Mettler, drop point, °C. | 109 | 113 | — | 110 to 120 |
| Brittlepoint | −9° C. | — | — | −25 |

[a]Ring and Ball softening points: 84° C.; Mettler drop point: 88° C.

The rubberized asphalt processing oil mixture produced as shown in the runs of Table I was extruded in several different extruders. The following examples describe the procedure and results from the various extrusions of the rubberized asphalt, processing oil mixture.

EXAMPLE 1

A modified rubberized asphalt, processing oil mixture having the following properties:

| | | |
|---|---|---|
| Mettler drop point | | 109° C. |
| Penetration | | 160 |
| Viscosity and poises | | |
| Epprecht-Rheomat-15 | 120° C. | 2500 ± 5% poises |
| | 140° C. | 425 ± 5% poises |

was extruded in a NRM 1-inch bench model extruder. The extrusion obtained under various conditions were optimized at 30 to 35 grams per minute for a 3/16-inch strand at 40 to 55 rpm screw speed. The extrudate had a smooth consistency showing the advantage of additional blending in the extruder. The die temperatures of 105° to 110° C. had the best extrusion rates despite difference in the feed temperatures when temperatures ranging from 117° to 134° C. were in the center of the extruder. Data from several extrusion runs in the NRM 1-inch bench model extruder are presented in Table II.

TABLE II

Extrusion Runs of NRM 1" Bench Model Extruder

| Feed Temp. °C. | °C. Throat | °C. Center | °C. Die | Wt. Extruded | Time min. | Rate g/min. |
|---|---|---|---|---|---|---|
| | | Screw @ 40 rpm | | | | |
| (1) 24 | 62 | 117 | 110 | 204 | 6.5 | 31.4 |
| (2) 98 | — | 64 | 53<br>(52–54) | 139.5 | 10 | 14 |
| (3) 92 | 44<br>(59–86) | 61<br>114 (103) | 53 | 59 | 13 | 4.5 |
| (4) 120 | 73 | −116 | 90–100<br>(96–114) | 411 | 25 | 16.4 |
| (5) 130<br>(143–150) | 91<br>(86–97) | 133<br>131–137 | 105<br>106–112 | 600 | 18⅞ | 31.6 |

TABLE II-continued

Extrusion Runs of NRM 1" Bench Model Extruder

| Feed Temp. °C. | °C. Throat | Center | Die | Wt. Extruded | Time min. | Rate g/min. |
|---|---|---|---|---|---|---|
| (6) 147 (a) | 92 | 134 | 109 | 520 | 16½ | 31.5 |
| | | Screw @ 55 rpm | | | | |
| | (83–94) | (129–139) | (101–103) | | | |
| (7) 135–141 (b) | 89 | 134 | 102 | 512 | 15 | 34.1 |
| | | Screw @ 20 rpm | | | | |
| (8) 146°–153° | 81–96 | 137–134 | 99–102 | 276 | 12 | 23 |

(a) Temperature dropped to 137 in hopper during addition of fresh material.
(b) Temperature dropped to 125 during addition of material.

EXAMPLE 2

A rubber modified asphalt, processing oil mixture as produced in the runs of Table I was extruded from a Davis-standard extruder, which had a 2½ inch screw. The adhesive composition was extruded into strips which were 60 to 90 mils thick and 14 inches wide and it was collected on release paper and topped with a second sheet of release paper. The sheet was subsequently split into 7-inch strips and then cut to 7-inch by 8-inch pieces which yielded pieces having an actual and final dimension of 6¾ inches by 7+ inches. The rubber modified asphalt, processing oil mixture used in this extrusion is described in Table I as Runs 2 and 3. The rate of extrusion from the Davis extruder was very low due probably to insufficient depths in the screw. The extrusion temperature averaged 75° C. during this run and, at this temperature, the extrudate maintained the configuration of the die. Higher temperatures should be avoided because, at these temperatures, the mixture tends to flow and is more difficult to manage.

EXAMPLE 3

A rubber modified asphalt processing oil mixture produced in the same manner as shown in Table I was transferred into an NRM extruder through a 2-inch valve and was extruded through an available die at the rate of 500 lbs. per hour, or linearly, at a rate of 33 feet per minute. About 200 pounds of a 5½-inch wide extrudate of adhesive composition was extruded through the die onto release paper. The extrudate which is the gap-filling, adhesive composition was topped with a second piece of release paper and wound.

EXAMPLE 4

A rubber modified asphalt processing oil mixture produced in the same manner as the mixtures in Table I was extruded through a less expensive but efficient Moyno 2L4 pump. The rates of extrusion were as follows:

at 41 rpm, 21 psi and 124° C.: 264 lbs./hr.
at 23 rpm, 25 psi and 124° C.: 120 lbs./hr.
at 48–50 rpm, 21 psi and 120° C.: 215 lbs./hr.

The extrudate was sandwiched between release paper obtained from Daubert Chemical Company and having a product designation as 1-65 KG-F. This extrudate covered on both sides by release paper is the gap-filling, adhesive composition which is applied with the release paper removed between a high density polyethylene tie plate and the dapped area of a wood, concrete or high density polyethylene cross tie.

Table III contains data on compression lap shear strengths developed between high density polyethylene and high density polyethylene, and high density polyethylene and creosoted wood, where the gap-filling, adhesive composition is used. The contact area between the high density polyethylene/high density polyethylene and high density polyethylene/creosoted oak was 4 sq. inches, and these materials were aged for 72 hours prior to tests in compression. The test procedure was according to ASTM D 904-49 for strength properties of adhesives in shear by compression loading.

TABLE III

Compression Lap Shear Strengths
Developed Between HDPE/HDPE and HDPE/Creosoted Oak Contact Area = 4 square inches
Aged 72 hours prior to test in compression
Test procedure according to ASTM D 904-49 for Strength Properties of Adhesives in Shear by Compression Loading.

| Adhesive | Rate of Application | Drying Time, min. | Bond Strength psi |
|---|---|---|---|
| A. HDPE to HDPE | | | |
| 1 | 1 g/4 in.$^2$ | 15 | 4 |
| | 0.5 g/4 in.$^2$ | 15 | 3.5 |
| 2 | 1 g/4 in.$^2$ | 15 | 3 |
| 3 | 1 g/4 in.$^2$ | 15 | 2.5 |
| 4 | 1 g. | retention under 2000 lb. load ≈ 70% | 9 |
| B. Wood to HDPE | | | |
| 5 | 1 g. | | 9 |

The gap-filling, adhesive composition, which is the composition of this invention, becomes part of an assembly containing a high density polyethylene tie plate in the dapped area of a wood, concrete, or high density polyethylene cross tie without the loss of solvents. The composition becomes part of the assembly by responding to pressure rather than depending on any kind of chemical reaction. Upon application of a load, the composition spreads and acts as a gap filler since it has fluidity under the applied load and makes good contact on substrates such as wood, concrete, and high density polyethylene. Accordingly, the composition has a greater viscoelasticity than that of asphalt, and has the desired adhesion for wood, concrete, and high density polyethylene.

According to the provisions of the patent statutes, I have explained the principle, preferred construction, and mode of operation of my invention and have illustrated and described what I now consider to represent its best embodiment. However, I desire to have it understood that, within the scope of the appending claims, the invention may be practiced otherwise than as specifically illustrated and described.

I claim:

1. A gap-filling, adhesive composition for use between a polymeric tie plate made of a polymer of the group consisting of polyolefins and polyurethanes and the dapped area of a wood, concrete or polyethylene railroad cross tie which comprises:

(a) 65 to 75 wt. % of an asphalt having a softening point in the range of 75° to 100° C. and a penetration in the range of 10 to 50;

(b) 10 to 20 wt. % of a styrene butadiene copolymer having a molecular weight in the range of 60,000 to 91,000; and (c) 7 to 25 wt. % of a processing oil having a viscosity in the range of 427 poises at 37.78° C. to around 2,500 poises at 37.78° C. and a flash point in the range of 210° C. to 250° C. and the composition has a viscosity in the range of about 100 to 300 poises at 150° C.

2. An assembly for securing a railroad rail to a crosstie, comprising:

(a) a wooden crosstie having a dapped area;

(b) a polymeric tie plate fabricated of a polymer selected from the group consisting of a polyolefin and a polyurethane;

(c) an adhesive composition interposed between the dapped area of said crosstie and said polymeric die plate, said composition comprising a mixture of:

1. from about 65 to 75 weight percent of an asphalt having a softening point in the range of about 75 to 100° C. and a penetration in the range of about 10 to 50;
2. from about 10 to 20 weight percent of a styrene-butadiene block copolymer having a molecular weight in the range of about 60,000 to 91,000;
3. from about 7 to 25 weight percent of a processing oil having a viscosity in the range of about 427 to 2,500 poises at about 38° C. and a flash point in the range of about 210° C.; and
4. from about 0.8 to 2.0 weight percent of an antioxidant;

whereby a railroad rail may be mounted upon the assembly of said crosstie, said adhesive composition and said polymeric tie plate, and secured to said crosstie with spikes.

3. The assembly of claim 2 wherein said polyolefin is selected from the group consisting of high density polyethylene, ultra high density polyethylene and polypropylene.

4. A method for securing a railroad rail to a crosstie, comprising the steps of:

(a) providing a wooden crosstie having a dapped area;

(b) placing an adhesive composition within the dapped area of said wooden crosstie, said adhesive composition comprising a mixture of:

1. from about 65 to 75 weight percent of an asphalt having a softening point in the range of about 75° to 100° C. and a penetration in the range of about 10 to 50;
2. from about 10 to 20 weight percent of styrene-butadiene block copolymer having a molecular weight in the range of about 60,000 to 91,000;
3. from about 7 to 25 weight percent of a processing oil having a viscosity in the range of about 427 to 2,500 poises at about 38° C. and a flash point in the range of about 210° C.;
4. from about 0.8 to 2.0 weight percent of an antioxidant;

(c) placing a polymeric tie plate within the dapped area of said wooden crosstie so that said adhesive composition is interposed between said wooden crosstie and said polymeric tie plate, said polymeric tie plate fabricated of a polymer selected from the group consisting of a polyolefin and a polyurethane; whereby a railroad rail may be mounted upon the assembly of said wooden crosstie, said adhesive composition and said polymeric tie plate, and secured to said wooden crosstie with spikes.

5. The method of claim 4 wherein said polyolefin is selected from the group consisting of high density polyethylene, ultra high density polyethylene and polypropylene.

* * * * *